UNITED STATES PATENT OFFICE.

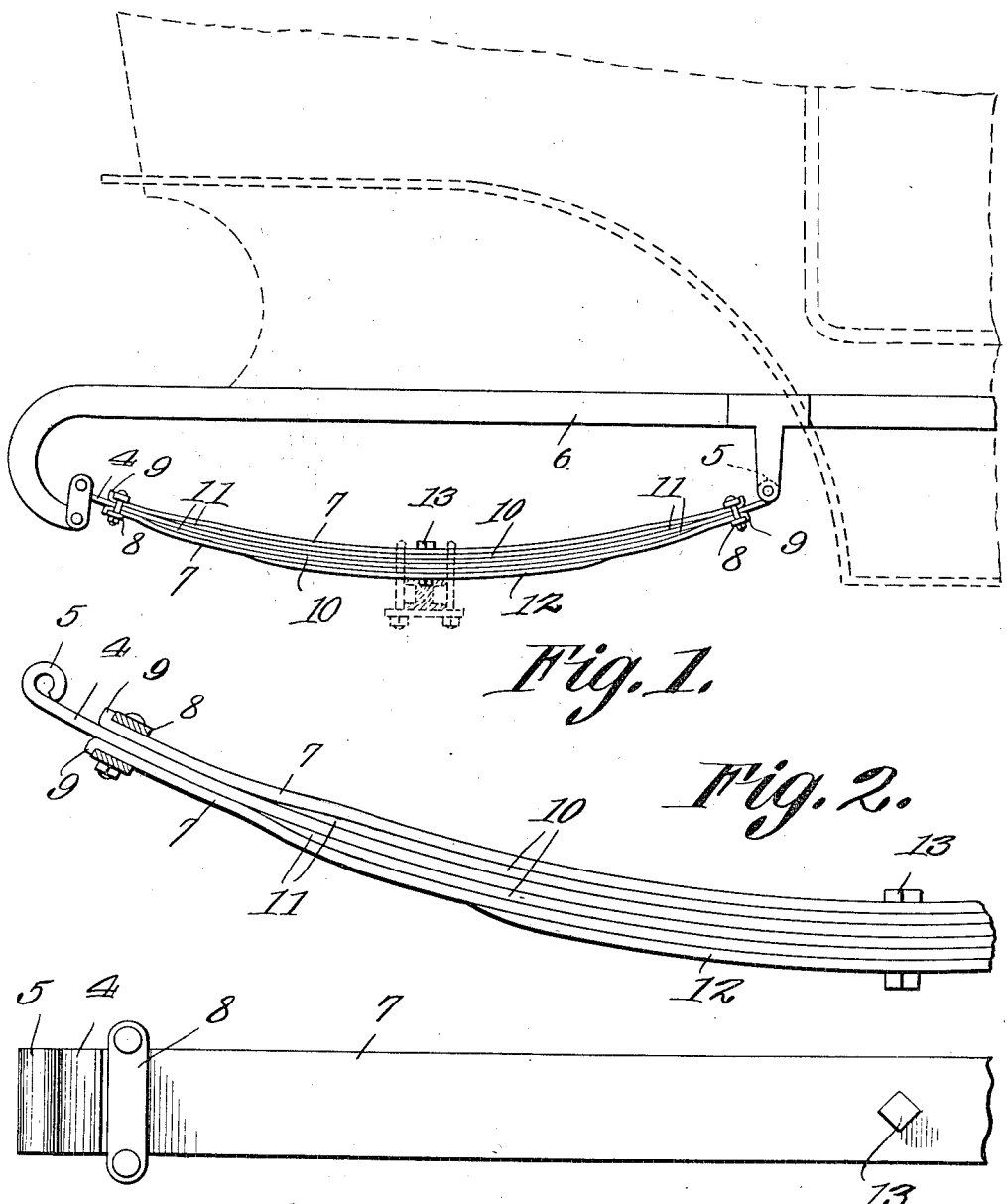

JOHN M. BATEMAN, OF COALINGA, CALIFORNIA.

SHOCK-ABSORBING SPRING.

1,120,671.  Specification of Letters Patent.  Patented Dec. 15, 1914.

Application filed February 13, 1914. Serial No. 818,517.

*To all whom it may concern:*

Be it known that I, JOHN M. BATEMAN, a citizen of the United States, residing at Coalinga, in the county of Fresno and State of California, have invented a new and useful Shock-Absorbing Spring, of which the following is a specification.

This invention relates to improvements in shock absorbing springs.

An object of the present invention is to provide a vehicle spring which will absorb and eliminate the recoils and shocks of the spring when the load is temporarily released and at the same time will retain the required resiliency.

A further object is to provide a spring including a plurality of superimposed leaf elements and which are so arranged that the friction resulting from the relative movement of the leaf springs will be utilized in absorbing the shocks and recoils.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferred embodiment of my invention is illustrated, in which:—

Figure 1 is a view in side elevation of my improved shock absorbing spring and diagrammatically illustrating a portion of a vehicle supported thereabove. Fig. 2 is an enlarged view of one half of the spring, more clearly disclosing the construction thereof. Fig. 3 is a top plan view of the foregoing.

Referring to the drawings in which similar reference numerals designate corresponding parts throughout the several views, 4 is the main spring element and is provided with the curled ends 5 by means of which it is secured to the vehicle frame 6. Extending nearly the entire length of the main spring element 4 are the secondary leaf spring elements 7 which are positioned above and below the main spring element to which they are rigidly secured by the clamps 8. The ends of the secondary spring elements are bent upward or offset as at 9 and which provides shoulders against which the clamps 8 rest and prevent the relative shifting or displacement of the main and secondary spring elements. Interposed between the main and secondary spring elements are the supplemental leaves 10 which are provided with the tapering ends 11 which are adapted to wedgingly and frictionally engage the surfaces of the spring leaf elements with which they contact. The supplemental spring elements terminate short of the ends of the secondary spring elements so that the spring as a whole will possess the requisite strength and resiliency.

Extending below the lower secondary spring leaf element 7 is the reinforcing spring leaf 12, it being noted that there may be a plurality of these leaves, gradually diminishing in length, if desired. A bolt 13 extends through the center of the spring elements and holds the same from displacement at this point.

The desirable features of the spring as thus constructed reside in the fact that the spring will possess shock absorbing qualities as well as the usual and requisite resiliency thus providing for the easy riding of a vehicle equipped with these springs. When the spring is compressed the supplemental leaves with their tapering ends will force themselves between the main and secondary spring elements, wedgingly and frictionally engaging the same, to thus absorb sudden shocks, but allowing for the gradual bending of the spring. Also the recoil is checked in a similar way by the friction between the tapering edges in wedged engagement with the main and secondary leaf elements. In addition to the frictional absorbing of the shocks by the supplemental leaves acting between the main and secondary leaves, the upper secondary leaf 7 when taken in conjunction with the main leaf 4 also forms a spring, absorbing and preventing an upward bending of the spring, as it is thought will be readily appreciated. The secondary spring leaf elements are slightly bent in an outward and diverging direction at those points adjacent the tapering ends of the supplemental leaves as clearly illustrated in Fig. 2. This increases the wedging action as explained, and insures the successful absorbing of shocks.

Having thus fully described my invention, what I claim to be new and original with me is:—

1. A vehicle spring comprising a main spring element, secondary spring leaf elements relatively shorter than the main spring element and positioned thereabove and therebelow, supplemental leaves interposed between the main and secondary spring leaf elements and relatively shorter than the latter, and clamps engaging the ends of said secondary spring leaf elements and the said main spring leaf element.

2. A vehicle spring comprising a main spring element, secondary spring leaf elements relatively shorter than the main spring element and positioned thereabove and therebelow, supplemental leaves interposed between the main and secondary spring leaf elements and relatively shorter than the latter, said supplemental leaves provided with tapering ends, and clamps engaging the ends of said secondary spring leaf elements and the said main spring leaf element.

3. A spring comprising a main spring element, means for securing the ends thereof to a frame, secondary spring elements positioned above and below said main spring element, relatively shorter than the same and clamped thereto at their ends, said secondary spring elements being bent away from the said main spring element intermediate their ends, supplemental leaves interposed between the main and secondary spring leaf elements with tapering ends, said tapering ends frictionally and wedgingly engaging the bent portions of the secondary spring leaf elements, and a reinforcing spring leaf element positioned below and into contact with the lower secondary spring leaf element.

4. A spring comprising a main spring element, a secondary spring element clamped at its ends thereto, said secondary spring element being bent away from the said main spring element intermediate its ends, a supplemental leaf interposed between the main and secondary spring elements and provided with tapering ends, said tapering ends contacting with and frictionally and wedgingly engaging the bent portions of the said secondary spring leaf element and the main spring element and providing for the frictional absorption of shocks.

In testimony that I claim the foregoing as my own, I have hereto affixed my signature in the presence of two witnesses.

JOHN M. BATEMAN.

Witnesses:
H. P. JAYNE.
THOS. R. MCINTYRE.